US006470045B1

United States Patent
Fuentes

(10) Patent No.: US 6,470,045 B1
(45) Date of Patent: Oct. 22, 2002

(54) COMMUNICATION PROTOCOL BETWEEN A TRANSCEIVER UNIT AND TRANSPONDERS OR TRANSCEIVERS ASSOCIATED WITH SAID UNIT

(75) Inventor: Vincent Fuentes, Chez-le-Bart (CH)

(73) Assignee: Em Microelectronic-Marin SA, Marin (CH)

( * ) Notice: Subject to any disclaimer, the term of this patent is extended or adjusted under 35 U.S.C. 154(b) by 0 days.

(21) Appl. No.: 09/151,803

(22) Filed: Sep. 10, 1998

(30) Foreign Application Priority Data

Sep. 11, 1997 (EP) .............................. 97115772

(51) Int. Cl.[7] .............................. H04B 1/38
(52) U.S. Cl. .............................. 375/220
(58) Field of Search .............................. 375/219, 220, 375/222; 370/282, 299; 455/463, 524, 39, 73, 88, 552, 575, 90; 340/901, 933

(56) References Cited

U.S. PATENT DOCUMENTS

| 3,980,825 | A | | 9/1976 | Morrien | |
|---|---|---|---|---|---|
| 5,128,669 | A | * | 7/1992 | Dadds et al. | 340/901 |
| 5,144,314 | A | | 9/1992 | Malmberg et al. | |
| 5,311,185 | A | * | 5/1994 | Hochstein et al. | 342/44 |
| 5,448,242 | A | | 9/1995 | Sharpe | |
| 5,515,035 | A | | 5/1996 | Gut | |
| 5,568,472 | A | * | 10/1996 | Umeda et al. | 370/342 |
| 5,608,759 | A | * | 3/1997 | Fujiwara | 375/242 |
| 5,821,877 | A | * | 10/1998 | Fallah | 340/825.54 |
| 5,926,757 | A | * | 7/1999 | Luijten et al. | 455/422 |
| 5,978,366 | A | * | 11/1999 | Massingill et al. | 370/337 |
| 5,983,090 | A | * | 11/1999 | Aoki | 455/403 |
| 6,069,922 | A | * | 5/2000 | Dyke | 375/285 |

FOREIGN PATENT DOCUMENTS

| EP | 266285 | 10/1987 |
|---|---|---|
| EP | 486 983 A2 | 5/1992 |
| EP | 589 217 A1 | 3/1994 |

* cited by examiner

Primary Examiner—Chi Pham
Assistant Examiner—Emmanuel Bayard
(74) Attorney, Agent, or Firm—Sughrue Mion, PLLC

(57) ABSTRACT

The communication protocol between at least one transceiver unit (communication unit) and transponders or transceivers (transponders) associated with said unit is characterised in that at least one initial command is sent by said unit to generate interaction with said transponders entering its field of action, said initial command having at least partially a coding with a specific time structure which is different from the basic time structure used for encoding said coded data. The specific time structure has greater coding time periods than the coding time periods of the basic time structure. At least one coding period of the specific time structure has a constant characteristic electric value over a time interval greater than the duration of said constant characteristic electric value able to appear in any bit sequence having the basic time structure.

13 Claims, 2 Drawing Sheets

COMMUNICATION PROTOCOL BETWEEN A TRANSCEIVER UNIT AND TRANSPONDERS OR TRANSCEIVERS ASSOCIATED WITH SAID UNIT

BACKGROUND OF INVENTION

The present invention concerns a communication protocol between one or more transceiver units and transponders or transceivers. The transponders or transceivers respond to a transceiver unit by entering its field of action and interacting with the latter in accordance with a given protocol, associated with a defined coding of the commands and data exchanged between said transceiver unit (hereinafter <<communication unit >>) and said transponders or transceivers (hereinafter <<transponders >>).

Usually, the encoding of the commands and exchanged data is performed in accordance with a binary mode, i.e. a succession of logic bits <<1>> and <<0>>. The transmission of these logic bits is effected by means of an electromagnetic coding signal known to those skilled in the art. For example, these bits are transmitted by modulation or non-modulation of the carrier wave. For example, Manchester, Miller and differential bi-phase types of coding are known, which are applied to amplitude modulation (ASK: amplitude shift keying), phase modulation (PSK: phase shift keying), frequency modulation (FSK: frequency shift keying) and also others known to those skilled in the art.

The communication protocol defines the exchange of commands and data or information between one or more communication units and one or more transponders.

Certain communication protocols include data identification or transmission procedures composed of very long bit sequences formed of random bits and bits representing functions calculated using given algorithms from said random bit sequences and, possibly, from certain public or secret keys. There is a non-negligible probability that, during transmission of the aforementioned bit sequences, a communication unit generates a sequence corresponding to a valid system command during transmission of data or information other than a command. Such probable situations cause poor operation of the system when several transponders enter the field of action of a communication unit in a same time

SUMMARY OF THE INVENTION

Moreover, it is possible for transponders associated with different systems to enter the field of action of a communication unit belonging to a particular system. In such case, it is necessary to prevent the unit entering into communication with said transponders, which would cause undesired responses and disrupt the desired data exchanges. More precisely, a communication unit simultaneously receives in its field of action a transponder associated with the system of said unit and another transponder associated with another system. If the commands and data exchanges are performed in accordance with the same coding and the same coding time structure, at least a portion of the interrogation signal may correspond to a command actuating the transponder belonging to said other system, the latter starting to modulate. This creates disruption and confusion in the receiving part of said communication unit, which prevents proper reading of the transponder associated with the system of said unit.

Even in the event that the transponders include an anticollision protocol, the risk of interaction between a communication unit and transponders not associated with the system of said unit remains since there exists a multitude of different protocols.

In order to overcome the aforementioned problems and prevent transponders interacting or exchanging data with a communication unit belonging to a different system, the present invention proposes a communication protocol between at least one communication unit and transponders which are associated with the communication system of such unit and arranged for exchanging coded data with such unit, wherein said communication unit sends at least one initial command to establish communication with said transponders entering its field of action, this initial command having at least partially a coding with a specific time structure which is different from the basic time structure used for encoding data other than said at least one command.

As a result of the features of the protocol according to the invention, the portion of the initial command coding which has a different specific time structure from the basic time structure used for the coding of exchanged data, in particular data other than commands, prevents a random bit distribution sequence for any data exchange being confused with a command from a communication unit used to establish interaction with transponders. Thus, no transponder will be actuated by a coded data exchange between another transponder and a communication unit as long as all the transponders present in the field of action of the communication unit are arranged so as to interact with said unit following reception of a command signal having at least partially a coding with a specific time structure according to the present invention.

The present invention thus provides a reliable and efficient solution in the event of a consensus between the different manufacturers and suppliers of communication units and transponders at least as regards systems or applications which are similar or have a non-negligible probability of momentarily cohabiting in the same place or space.

It was mentioned hereinbefore that at least the initial command had at least in part a coding with a specific time structure, but several variants are possible and can be implemented by those skilled in the art without any particular difficulty. In particular, it is possible for all the commands to have at least partially a coding with a specific time structure according to the present invention. It is also possible for the initial command or all the commands to have only one initial bit and possibly a final bit in accordance with the specific time structure or to have all the bits coded with this specific time structure. In a particular implementation, the initial command and the final command of a data exchange between a communication unit and the transponders which are associated therewith have, at least partially, a coding with a different specific time structure from the basic time structure. In a preferred implementation, at least each first bit or initial bit of every command is generated on the basis of the specific time structure according to the invention.

It will be noted that it is also possible at least in the case of active transponders, for the commands and/or at least an initial response sent to a unit to be generated in accordance with a coding having a specific time structure according to the present invention. Those skilled in the art who understand the present invention will know how to apply it in an appropriate and efficient manner according to the various systems and protocols present without thereby departing from the scope of the present invention.

According to a preferred implementation of the protocol according to the invention, said specific time structure has a greater coding time period than the coding time period used by the basic time structure. In particular, during at least one coding time period, this specific time structure has a characteristic electric value which is constant over a time interval greater than any length of time or duration of said characteristic electric value able to appear in the coding(s) provided with said basic time structure.

As a result of this latter feature, the specific time structure provided for said at least one initial command cannot in any event correspond to the coding of any data with said basic time structure.

BRIEF DESCRIPTION OF THE DRAWINGS

The present invention will be better understood with the aid of the following description, made with reference to the annexed drawings given by way of non-limiting example, in which.

DETAILED DESCRIPTION OF THE INVENTION

Figure 1:
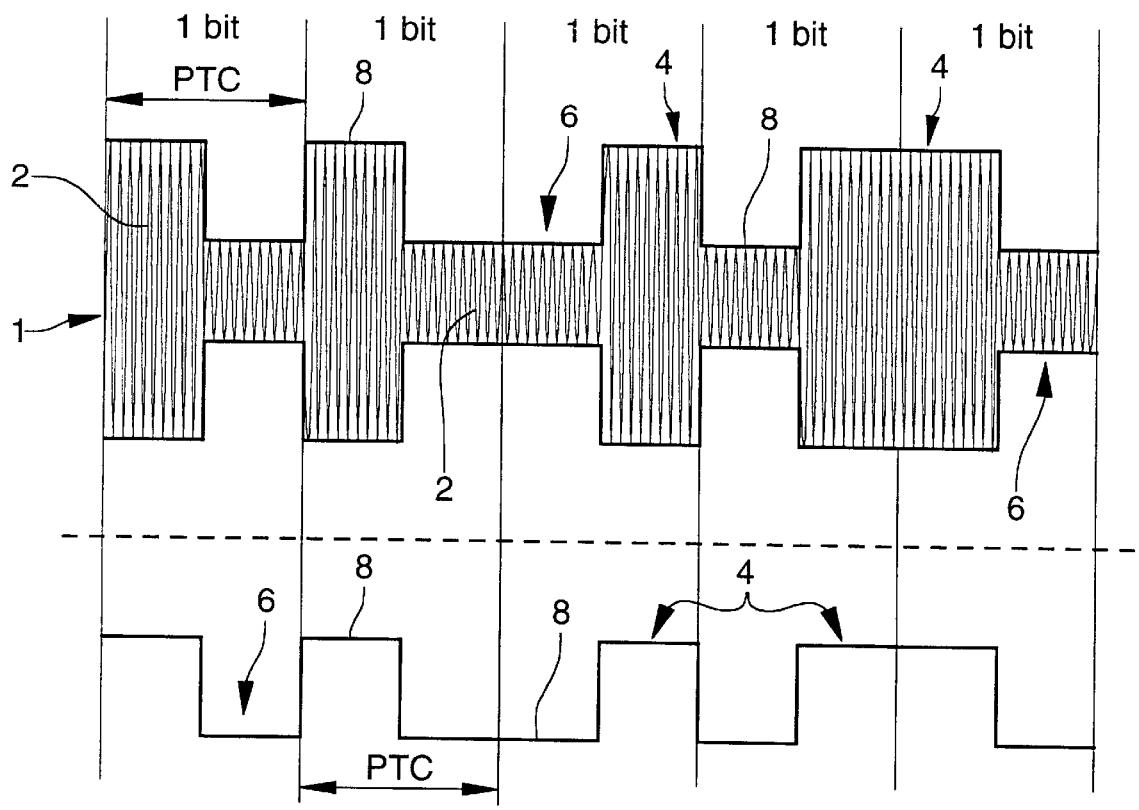
FIG. 1 shows a Manchester type coding in the case of amplitude modulation.
Figure 2:
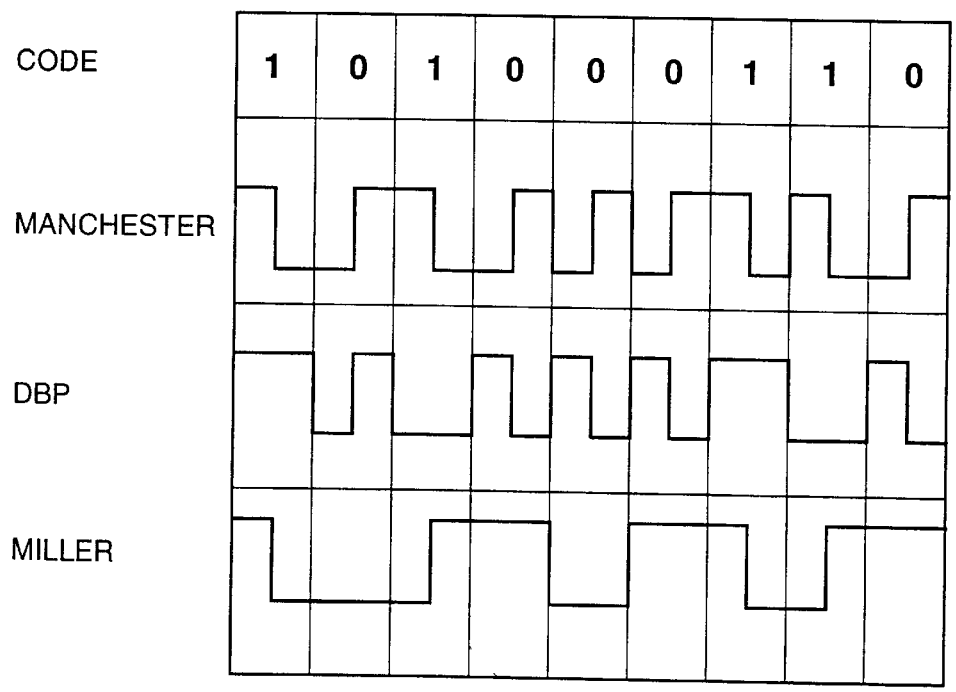
FIG. 2 shows various types of known coding.

With reference to FIGS. 1 and 2, the principle of amplitude modulation coding and various types of coding able to be used within the scope of the present invention will be briefly recalled hereinafter.

The upper portion of FIG. 1 shows an electromagnetic signal used to communicate coded data between a communication unit and any transponder of a plurality of transponders associated with said unit or to the operating system thereof. The binary coded signal is obtained by amplitude modulation where the bits are provided with a determined frequency defining a determined coding time period PTC. The electromagnetic signal is defined by a carrier wave 2 which is modulated in amplitude between a high level 4 and a low level 6 in the case of Manchester type coding. A transition between a high level and a low level or vice versa is performed inside each coding time period PTC. A<<1>> bit corresponds to a transition from a high level to a low level, while a <<0>> bit corresponds to a transition from a low level to a high level. The lower portion of FIG. 1 shows only the upper waveform 8 of signal 1. Hereinafter, only the schematic diagram of the upper waveform of the electromagnetic coding signal is shown for the description of the present invention.

FIG. 2 shows three types of coding in the case of an amplitude modulation where the high level corresponds to a non-modulation while the low level corresponds to a modulation of the electromagnetic coding signal. Thus, for a code given by way of example, the upper waveforms of the coding signal have been shown for the Manchester, DBP (differential bi-phase) and Miller types of coding, all three being able advantageously to be used within the scope of the present invention. Upon analysing the coded signals of FIG. 2, it will be noted that the high level or the low level has a length of time whose value is at the most equal to a coding time period PTC in the case of the Manchester or DBP codes and at the most equal to two coding time periods in the case of the Miller type of coding.

According to the present invention, at least one initial command sent by said communication unit has at least partially a coding with a specific time structure which is different from the basic time structure used in particular for encoding the coded data other than the commands. Starting from the fact that the duration of a same state (high level or low level) is limited in time whatever the length of the bit sequences and the distribution thereof at the heart of each sequence, the present invention proposes in preferred implementations to vary the coding time period at least partially for at least one initial command sent by a communication unit to generate interaction or to establish communication with transponders which are associated therewith. In other words, at least for the initial command, a specific time structure is provided relative to the basic time structure.

Figure 3:
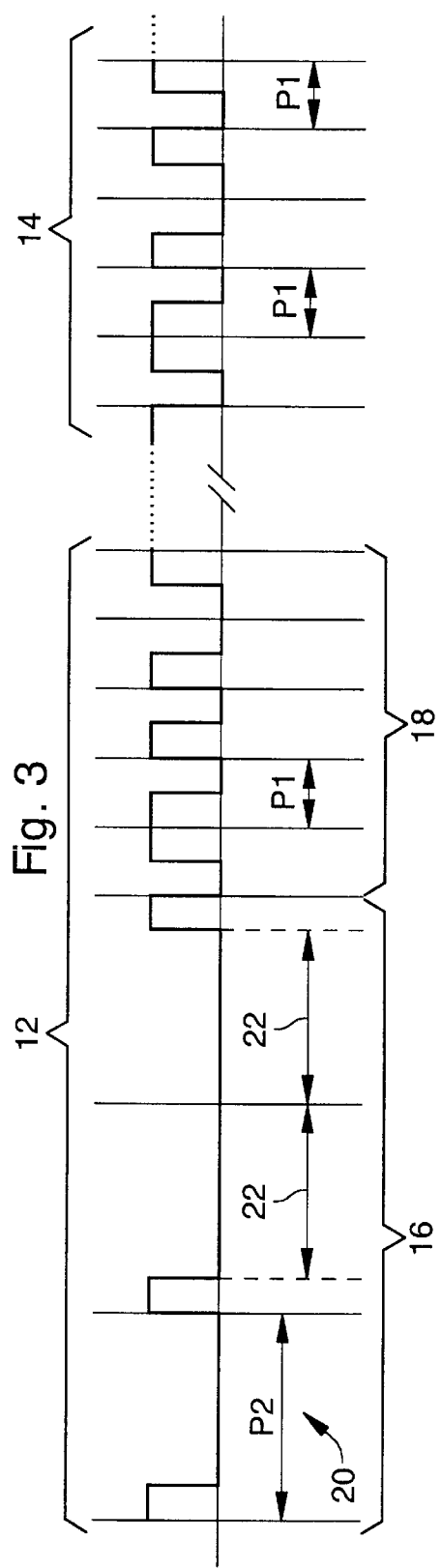
FIG. 3 shows schematically a first implementation of the protocol according to the invention.

FIG. 3 shows a first implementation of the communication protocol according to the invention in the non-limiting case of an amplitude modulation. A first control signal 12, hereinbefore called the initial command, has a first portion 16 coded using a specific time structure whose coding time period P2 is greater than the coding time period P1 of the basic time structure. Initial command 12 thus has a first portion 16 with a time structure specific to said initial command and a second portion 18 with a basic time structure. As was already mentioned hereinbefore, without departing from the scope of the present invention, various variants can be selected by those skilled in the art. In particular, only one first initial bit, or conversely, all the bits of said initial command may have the aforementioned specific time structure. In the implementation of FIG. 3, only the initial command has at least partially a specific time structure, the other coded data 14 have the basic time structure. In order to avoid any risk of confusion between the portions supplied with the specific time structure and any random bit sequence provided with the basic time structure, the invention provides that, during at least a first coding time period 20, the specific time structure has a characteristic electric value which is constant over a time interval 22 greater than the length of time of any constant characteristic electric value able to appear in the basic time structure. Time interval 22 forms a sub-period of coding time period P2 and differentiates completely the specific time structure from the basic time structure, and in particular from any combination of bits able to appear in a bit sequence generated with the basic time structure.

In particular in the event that the coding type used is one of those shown in FIG. 2, time interval 2 is equal to 2 ½ times coding time period P1 of the basic time structure. In an alternative, it is possible to increase time interval 22 so that it is greater than 2.5 times coding time period P1. Within the scope of the present invention, it is sufficient for time interval 22 to be greater than the duration or length of time of any constant characteristic electric value able to appear in the coding effected with the basic time structure. The constant characteristic electric value over time interval 22 corresponds to a low level of the amplitude modulated electric signal.

Figure 4:
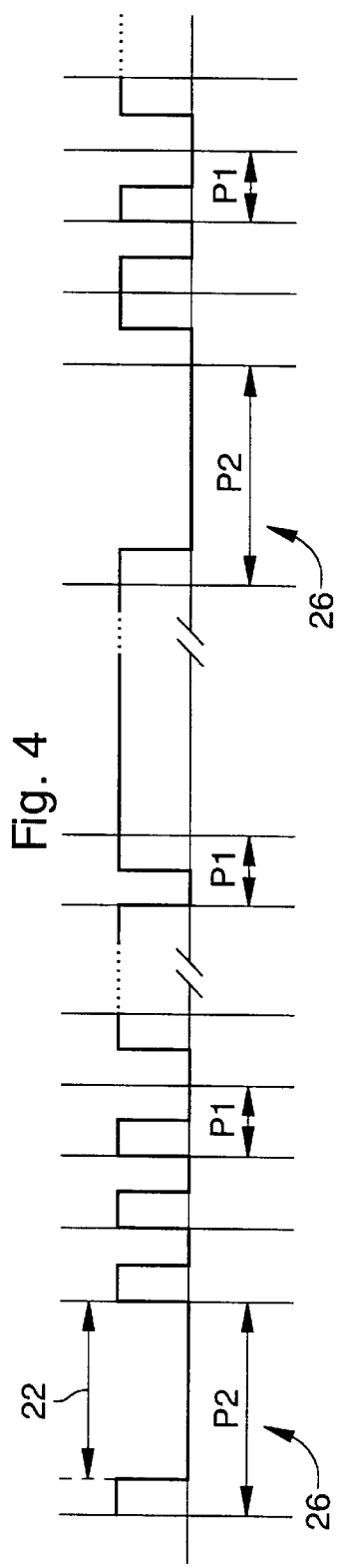
FIG. 4 shows schematically a second implementation of the present invention.
Figure 5:
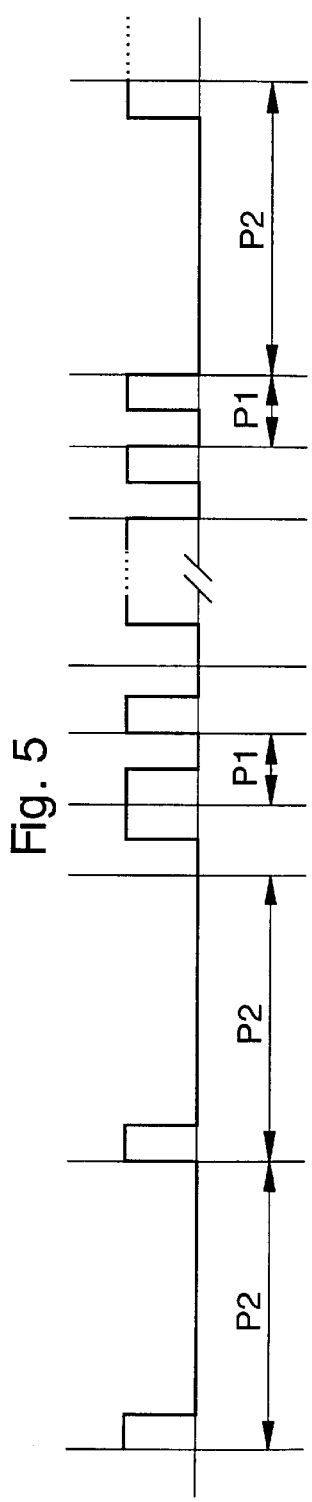
FIG. 5 shows schematically an alternative implementation of the present invention.

The type of coding used in FIGS. 3 to 5 corresponds to the Manchester type and it will be noted that the coding principle and the transitions between the high level and the low level or vice versa are similar in portion 16 and in portion 18 of first control signal 12, and in modulated electric signal 14 defining a coded piece of information exchanged following the initial command. One could envisage providing a different coding in the specific time structure from that used in the scope of the basic time structure. However, given that an essential aspect of the present invention concerns the coding time structure, the mixture of various coding types is not the primary object of the present invention.

FIG. 4 shows schematically a second implementation of the communication protocol according to the invention wherein any command sent by the communication unit has an initial bit 26 with a specific time structure as described previously with reference to FIG. 3. In alternative embodiments and in particular in the variant shown in FIG. 5, each command has a first portion and the final bit both having a specific time structure. Between the initial bit and the final bit of each command, either a basic time structure, or a mixture of the basic time structure and the specific time structure may be provided. Finally, all the commands can have entirely a specific time structure as described hereinbefore.

Although the examples given in FIGS. 3 to 5 have been made with reference to an amplitude modulated electric communication signal, it is understood that the present invention also applies to other known modes using the same coding types, in particular phase or frequency modulated electromagnetic signals. The general principle rests on a variation between at least two detectable levels, the time duration of at least one of these two detectable levels being sufficiently prolonged in the specific time structure so that any bit sequence having the basic time structure cannot be confused with a bit sequence having a specific time structure, this latter being at least provided for a portion of the initial command. According to a variant, this specific time structure is provided for at least a portion of each coded command sent by a communication unit.

What is claimed is:

1. A method of providing communication between at least one electromagnetic signal transceiver unit and transponders or transceivers associated with said unit and arranged for receiving from said unit at least one initial command and for exchanging coded data other than commands with said unit, said method comprising the steps of:

sending said at least one initial command, by said transceiver unit, to generate interaction or to establish communication with said transponders or transceivers entering a field of action of said unit; and encoding said at least one initial command at least partially with a coding having a specific time structure which is different from a basic time structure used for encoding said coded data.

2. The method according to claim 1, wherein the type of coding used with said specific time structure and said basic time structure is the same, a transitions, provided between a high level and a low level of the electromagnetic coding signal exchanged between said transceiver unit and said transponders or transceivers, being identical for characterising a <<0>> bit and a <<1>> bit.

3. The method according to claim 1, wherein said initial command has said specific time structure at least in the initial portion thereof.

4. The method according to claim 1, wherein all the commands sent by said transceiver unit each have at least partially a coding with said specific time structure.

5. The method according to claim 4, wherein all of said commands each have said specific time structure at least in the initial portions thereof.

6. The method according to claim 4, wherein all of said commands are coded with said specific time structure.

7. The method according to claim 5, wherein all of said commands are coded with said specific time structure.

8. The method according to claim 1, further comprising the step of choosing said specific time structure to have a coding time period different from the coding time period of said basic time structure.

9. The method according to claim 8, wherein the coding time period of said specific time structure is greater than the coding time period used in said basic time structure.

10. The method according to claim 9, wherein during at least a first coding time period, said specific time structure has a characteristic electric value which is constant over a time interval greater than all the lengths of time of said characteristic electric value able to appear in any bit sequence with said basic time structure.

11. The method according to claim 10, wherein said time interval is greater than or equal to 2.5 times the coding time period of said basic time structure.

12. The method according to claim 10, wherein said characteristic electric value corresponds to a low level of the electromagnetic coding signal for the commands and data exchanged between said transceiver unit and said transponders or transceivers.

13. The method according to claim 11, wherein said characteristic electric value corresponds to a low level of the electromagnetic coding signal for the commands and data exchanged between said transceiver unit and said transponders or transceivers.

* * * * *